United States Patent Office 3,323,859
Patented June 6, 1967

---

3,323,859
PROCESS FOR THE PREPARATION OF DIBASIC LEAD SALTS OF INORGANIC ACIDS
Alfred Szczepanek, Niederau uber Duren, and Günther Koenen, Lendersdorf uber Duren, Germany, assignors to Chemische Fabrik Hoesch K.G., Duren, Rhineland, Germany
No Drawing. Filed Oct. 9, 1964, Ser. No. 402,960
Claims priority, application Germany, Oct. 10, 1963, C 31.104
5 Claims. (Cl. 23—69)

This invention relates to a process for the preparation of dibasic lead salts of inorganic acids.

Dibasic lead salts of inorganic salts according to the present invention are salts of the composition $$2PbO.Pb(R)_n$$

wherein R may be a monovalent or divalent inorganic acid radical and $n$ is 2 when R is a monovalent inorganic acid radical, or $n$ is 1 when R is a divalent inorganic acid radical. They are widely used as color pigments or as heat and light stabilizers in the processing of halogen-containing polymers such as polyvinyl chloride. Basic lead salts based on carbonic acid, phosphorous acid, sulfuric acid and silicic acid are of particular importance. Their preparation is generally carried out by reacting lead oxide with the corresponding inorganic acid. Insofar as these methods may be used for preparing dibasic lead salts, they require long reaction times and the use of a very pure lead oxide since all water insoluble impurities of the lead oxide remain in the end product.

By means of the process according to the invention, dibasic lead salts of inorganic acids can be prepared free from impurities in short reaction times and using lead oxide which is only of a commercial grade of purity. The process is carried out in two reaction stages; in the first stage, commercial lead oxide is reacted in the aqueous phase with an aliphatic carboxylic acid which has at the most 6 carbon atoms, in the ratio of 3 moles of lead oxide to 2 moles of aliphatic monocarboxylic acid, and the clear or colloidal solution of the dibasic lead salts formed is freed from water-insoluble constituents by filtration. In the second stage, the dibasic inorganic lead salt is precipitated by double decomposition by adding an aqueous solution of a salt of the corresponding inorganic acid to the solution of the dibasic lead salt of the aliphatic acid.

The process permits the use of commercial litharge since all water-insoluble impurities can be removed by subsequent filtration. Another advantage lies in the fact that for dissolving lead oxide to the dibasic lead salts of aliphatic carboxylic acids, it is possible to use dilute solutions such as acetic acid solutions which are not worth working up owing to the costs involved. Thus, for example, acetic acid solutions obtained commercially, having an acetic acid content of 0.5 to 5% can be used for the preparation of dibasic lead acetate solutions. In the same way, formic acid, propionic acid, butyric acid, valeric acid or caproic acid are suitable for the preparation of dibasic lead salts of aliphatic carboxylic acids, which salts are subsequently converted into the desired dibasic lead salts of inorganic acids by double decomposition. The water-soluble salts of inorganic acids required in this reaction step may be produced by neutralisation of the inorganic acids. It is advantageous to use salt solutions which are obtained as waste products in chemical processes, for example filtrates containing sodium sulfate solutions or soda such as are obtained in the production of silicic acid. The process thus permits the utilization of solutions of aliphatic carboxylic acids and of salts for which there would otherwise be no further technical use, especially of alkali metal salts of inorganic acids.

In carrying out the reaction, it is not important whether the aqueous solution of the dibasic lead salt of a lower carboxylic acid is added to the solution of a water-soluble salt of the inorganic acid or whether the reverse procedure adopted. The double reaction can be carried out within a fairly wide temperature range from room temperature to the boiling point of the solutions, if desired also under pressure. Since the process involves an ionogenic precipitation reaction, the crystal form and particle size of the precipitated dibasic lead salts of inorganic acids can be varied by the concentration of the solution, the precipitation temperatures and the rate of addition during precipitation. It is thereby possible to adjust the properties of the product which determine its subsequent use, for example, as a white pigment and its effects as stabilizer for chlorine-containing polymers, to the particular requirements.

The most important basic lead salt sof inorganic acids for industrial use at the present time are basic lead phosphites, basic lead sulfates, basic lead carbonates and basic lead silicates. Among the basic lead salts of phosphorous acid, the dibasic lead salt is particularly widely used as heat and light stabilizer and as white pigment in the polyvinyl chloride processing industry. It is prepared, for example, in accordance with U.S. Patent No. 2,483,469 by slowly adding phosphorous acid to a suspension of very pure lead oxide in the presence of some lead acetate as solubilizing catalyst. The process requires a reaction time of several hours. The preparation of dibasic lead phosphite by reacting a basic lead acetate solution with ammonium phosphite cannot be carried out in accordance with the above mentioned patent. On the other hand, it has been found that the preparation of a dibasic lead acetate solution in the ratio of 3 mols of litharge to 2 mols of acetic acid is readily possible and that by adding sodium phosphite to the solution of dibasic lead acetate, a water-insoluble white product is formed which according to its analysis corresponds to the formula $2PbO.PbHPO_3$.

The product can thus be regarded as dibasic lead phosphite. Debye-Scherrer photographs show, on the other hand, that the crystal structure of this product does not correspond to that of the product obtained by reacting lead oxide with phosphorus acid. The reaction would appear to proceed according to the following equation:

$$2PbO.Pb(CH_3COO)_2.yH_2O + Na_2HPO_3$$
$$= 2PbO.PbHPO_3.yH_2O + 2NaOOCCH_3$$

In carrying out the reaction, it is not important whether the dibasic lead acetate solution is added to the sodium phosphite solution or conversely.

Basic lead sulfates are widely used as heat stabilizers for stabilizing halogen-containing polymers, especially polyvinyl chloride. Tribasic or tetrabasic lead sulfate is generally used for this purpose. These high basic lead sulfates are unsuitable for some purposes because they have a saponifying action on some plasticizers and tend to undergo color reactions with certain types of polyvinyl chloride. It is more suitable, especially for working up hard polyvinyl chloride, to use lead sulfates of lower basicity for stabilizing.

According to the process of the invention, dibasic lead sulfate can be prepared by double reaction between dibasic lead acetate and sodium sulfate in aqueous solution, using impure litharge, and in this process the crystal size can be varied with the concentration of the solution, the precipitation temperature and the speed of precipitation.

The dibasic lead sulfate prepared by this method has very good distribution and stabilizing properties in polyvinyl chloride.

Basic lead carbonates are widely used as white pigments and stabilizers for halogen-containing polymers, especially a lead carbonate of the formula $Pb(OH)_2.2PbCO_3$ which is sold under the name "White Lead." The preparation may be carried out inter alia by reaction of lead salt solutions with alkali metal carbonate solutions with heating.

The hydrochloric acid liberated during the processing of halogen-containing polymers may decompose the lead carbonate portion in the lead white to form gaseous carbon dioxide $CO_2$ which in turn may give rise to the formation of pores in the resulting plastic article. It has been proposed therefore to use dibasic lead carbonates of the formula $2PbO.PbCO_3$ for stabilizing polyvinyl chloride. Dibasic lead carbonate can be obtained by thermal decomposition of lead carbonate. The process of the invention now permits simple preparation of dibasic lead carbonate by double decomposition between a dibasic lead acetate solution and an alkali metal carbonate solution. In this reaction, the alkali metal carbonate solution should be present partly in the form of bicarbonate. Mixtures of carbonate and bicarbonate are either used from the start or the pH of the carbonate solution is adjusted to about 7 by the addition of dilute acids. The crystal form and particle size may be varied and adapted to the purpose of use by varying the concentration, precipitation temperature and speed of precipitation.

The product obtained by double decomposition corresponds analytically to the formula $2PbO.PbCO_3$ and has very good qualities as regards its ability of mixing with polyvinyl chloride and stabilizing it.

Basic lead silicates are used as stabilizers for halogen-containing resins, especially polyvinyl chloride. They produce special qualities such as translucency of the polyvinyl chloride mixture, dry handle and advantageous dielectric properties. One known method for the production of basic lead silicates is the reaction of lead oxide with reactive silicic acid in the aqueous phase. Regarding its stabilizing properties, it is desirable to have as high a lead content as possible but by the known methods it is not possible to react 3 moles of litharge with 1 mole of silicic acid $SiO_2$. The maximum uptake capacity of silicic acid for lead oxide is not greater than that which corresponds to a molar ratio of PbO to $SiO_2$ of 1.5:1. By the process of the invention it is, however, possible to prepare dibasic lead silicates by reacting, for example, a dibasic lead acetate solution with an alkali metal silicate solution such as with sodium silicate. The products thus obtained can be varied with respect to their crystal size and shape and their lead content by varying concentration, precipitation temperature and speed of precipitation.

Since silicic acid is able to form anions of various molecular weight, it is possible to prepare dibasic lead salts of different silicic acid contents. The ratio of PbO to $SiO_2$ thus may vary from 3:1 to 6:1.

The following examples illustrate the preparation and use of the products of the invention. Unless otherwise stated, all parts are parts by weight.

*Example 1a.—Dibasic lead phosphite*

91 g. of lead oxide are dissolved at 60° C. with stirring, in 566.5 ml. of dilute acetic acid containing 16.5 g. of acetic acid. In a second container, a sodium phosphite solution is prepared from 11.15 g. of phosphorous acid and 10.85 g. of sodium hydroxide with addition of 315 ml. of water at 20° C. Both the solution of the dibasic lead salt and the sodium phosphite solution are heated to 50° C. and the dibasic lead acetate solution is added within 2 hours with stirring, to the sodium phosphite solution at a rate of 4 ml. per minute. When all the lead acetate solution has been added, the mixture is stirred for 2 hours at 50° C. and filtered, the sodium acetate formed is washed out and the white precipitate obtained is dried at 90° C. The following analytical data were obtained:

$2PbO.PbHPO_3.H_2O$: Theoretical: Pb, 82.7; $PO_3$, 10.5. Found: Pb, 82.8; $PO_3$, 10.4.

*Example 1b.—Dibasic lead phosphite*

Quantities of reaction components and preparation of the solutions were as in 1a above. The filtered dibasic lead acetate solution is cooled to about 20–30° C. and the sodium phosphite solution prepared at 20° C. is rapidly added to the dibasic lead acetate solution. The product thus obtained is extremely finely divided. After filtration and washing out the sodium acetate formed, the product is dried at 90° C. Analytical data as under 1a.

*Example 2.—Dibasic lead sulfate*

A dibasic lead acetate solution is prepared as described in Example 1 from 89.4 g. of lead oxide and 551 ml. of dilute acetic acid containing 16 g. of acetic acid. A sodium sulfate solution prepared from 13.1 g. of sulfuric acid, 10.66 g. of sodium hydroxide and 60 ml. of water is added to this solution at a temperature of 90° C. to 100° C. and at a rate of 2 ml. per minute. After filtration, the sodium acetate formed is washed out with water and the white product obtained is dried at 90° C. to 100° C. The following analytical data are obtained:

$2PbO.PbSO_4$: Theoretical: Pb, 82.8; $SO_4$, 12.8. Found: Pb, 82.8; $SO_4$, 12.7.

*Example 3.—Dibasic lead carbonate*

A dibasic lead acetate solution is prepared as described in Example 1 from 94 g. of litharge and 576.8 ml. of dilute acetic acid containing 16.8 g. of acetic acid, and filtered to remove impurities. A solution is prepared from 14.88 g. of sodium carbonate in 300 ml. of water and adjusted to pH 7 by the addition of acetic acid. The soda solution is then added, with stirring, to the solution of the dibasic lead acetate at a temperature of 50° C. and a rate of 500 ml. per minute. After filtration, the sodium acetate formed is washed out and the product is dried at 80° C. The following analytical data were obtained:

$2PbO.PbCO_3$: Theoretical: Pb, 87.3; $CO_3$, 8.4. Found: Pb, 86.9; $CO_3$, 8.5.

*Example 4a.—Dibasic lead silicate molar ratio*

Pb : $SiO_2$ = 3 : 1

538 ml. of dibasic lead acetate solution containing 141 g. of lead per liter or 94.3 g. of dibasic lead acetate prepared according to Example 1 are diluted with 500 ml. of water, and 19.63 ml. of a dilute water glass solution are added dropwise at 35° C. to 38° C. within 30 minutes. The waterglass solution contains 7.34 g. of $SiO_2$ and 7.57 g. of $Na_2O$. After the addition, the mixture is stirred for one hour at 35° C. to 38° C. filtered and the precipitate washed free of sodium acetate with water. The white product obtained is dried at 110° C. The following analytical data were obtained:

$2PbO.PbSiO_2.2H_2O$: Theoretical: Pb, 81.1; $SiO_2$, 7.8. Found: Pb, 80.9; $SiO_2$, 8.0.

*Example 4b.—Dibasic lead silicate molar ratio*

Pb : $SiO_2$ = 6 : 1

636 ml. of dibasic lead acetate solution containing 141 g. of lead per liter or 111.5 g. of dibasic lead acetate prepared according to Example 1 are diluted with 700 ml. of water, and 271.6 ml. of a dilute waterglass solution are added dropwise thereto at 35° C. to 38° C. within 30 minutes. The waterglass solution contains 4.33 g. of $SiO_2$ and 8.96 g. of $Na_2O$. After the addition, the mixture is stirred for one hour at 35° C. to 38° C., filtered and the precipitate is washed free of sodium acetate with water. The white product obtained is dried at 80° C. The following analytical data were obtained:

$6PbO.SiO_2.4H_2O$: Theoretical: Pb, 86.3; $SiO_2$, 4.2. Found: Pb, 86; $SiO_2$, 4.5.

The dibasic lead phosphite prepared according to Example 1 and the product prepared according to Example 1 of U.S. Patent No. 2,483,469 were tested for their heat stabilizing properties and white pigment effect in a polyvinyl chloride mixture consisting of 100 parts of polyvinyl chloride suspension of K-value 70 (Vinnol H 100/70F), 50 parts of dioctylphthalate, 1 part of lubricating wax and 0.5 to 2 parts of dibasic lead phosphite.

The mixture was prepared in 10 minutes at 170° C. on rollers. The foils obtained were aged in an oven with natural circulation of air at 180° C. and the period required to effect a color change to deep brown was determined. In addition, the thermostability was determined by determining the occurrence of free acid at 180° C. according to DIN 53381. The white pigment effect was determined on pressure plates of 1.2 mm. in thickness produced from rolled sheets at 170° C., by determining the degree of whiteness against a black and white background, using the Elrepho instrument of the firm Zeiss. This instrument indicates the degree of whiteness in reflected light compared with magnesium oxide as standard. The figures given in percent denote the degree of whiteness in percent of magnesium oxide.

The following table shows the results obtained:

| Product | Parts of stabilizer | Heat stability oven 180° C., Min. | Heat stability after DIN 5338 180° C., min. | Degree of whiteness in percent MgO | |
|---|---|---|---|---|---|
| | | | | Black background | White background |
| Dibasic lead phosphite according to Patent No. 2,483,469 | 0.5 | 60 | 12 | 31 | 65 |
| | 1 | 70 | 27 | 41 | 64 |
| | 2 | 120 | 77 | 51 | 67 |
| Dibasic lead phosphite, Ex. 1a | 0.5 | 60 | 10 | 42 | 68 |
| | 1 | 80 | 18 | 53 | 72 |
| | 2 | 110 | 38 | 62 | 75 |
| Dibasic lead phosphite, Ex. 1b | 0.5 | 60 | 10 | 34 | 65 |
| | 1 | 110 | 38 | 46 | 68 |
| | 2 | 200 | 110 | 59 | 72 |

The values obtained show that the dibasic lead phosphite according to Example 1a has a greater white pigment effect than the reaction product of phosphorous acid and lead oxide, about the same values in the thermostability determination by the oven test but a poorer stabilizing effect when determined by the DIN method. Product 1b shows only a slight improvement as a white pigment but a considerable improvement as a heat stabilizer both according to the oven test method and according to the DIN method.

The heat stabilizing effect of the product described in Examples 2 to 4 was determined in a mixture of 100 parts of polyvinyl chloride suspension of K-value 70 (Vinnol H 100/70F), 50 parts of dioctylphthalate, 2 parts of stabilizer and 2 parts of lubricating wax in the oven at 180° C. The preparation of the mixture was carried out as described above. The results are shown in the following table:

| Type of stability | Parts of stabilizer | Heat stability 180° C. oven, min. |
|---|---|---|
| Without stabilizer | (¹) | 20 |
| Dibasic lead sulfate, Example 2 | 2 | 150 |
| Dibasic lead carbonate, Example 3 | 2 | 270 |
| Dibasic lead silicate, Example 4a | 2 | 60 |

¹ Without stabilizer.

We claim:
1. In a process of producing dibasic lead salts of inorganic acids of the formula

$$2PbO \cdot Pb(R)_n$$

wherein

R is a member selected from the group consisting of a monovalent inorganic acid radical and a divalent inorganic acid radical, and n is the numeral 2, when R is a monovalent inorganic acid radical, and is the numeral 1, when R is a divalent inorganic acid radical, the steps which comprise
(a) dissolving lead oxide in an aqueous solution of an aliphatic carboxylic acid having 1 to 6 carbon atoms in the ratio of 3 moles of lead oxide to 2 moles of said aliphatic carboxylic acid to yield an aqueous solution of the dibasic lead salt of said aliphatic carboxylic acid of the formula $2PbO \cdot Pb(Ac)_2$ wherein Ac is the radical of said aliphatic carboxylic acid,
(b) adding to said solution an aqueous solution of a salt of an inorganic acid, and
(c) recovering the precipitated dibasic lead salt of said inorganic acid from the reaction mixture.

2. The process according to claim 1, wherein the lead oxide is commercial grade lead oxide and wherein undissolved impurities are removed from the solution of the dibasic lead salt of the aliphatic carboxylic acid obtained in step (a) by filtration.

3. The process according to claim 1, wherein the salt of an inorganic acid added in step (b) is an alkali metal phosphite.

4. The process according to claim 1, wherein the salt of an inorganic acid added in step (b) is an alkali metal carbonate.

5. The process according to claim 1, wherein the salt of an inorganic acid added in step (b) is an alkali metal silicate.

References Cited

UNITED STATES PATENTS 1,163,052 12/1915 White et al. _____ 23—71
1,532,419  4/1925 Lloyd et al. _____ 23—71
2,483,469 10/1949 Kebrich _____ 23—105

FOREIGN PATENTS 15,406 1887 Great Britain.

OTHER REFERENCES

Friend, Text-Book of Inorganic Chemistry, vol. 5, Charles Griffin and Co., London 1917, p. 424.

Handbook of Chemistry and Physics, 36 Edition, Chemical Rubber Publishing Co., Cleveland, Ohio, 1954, p. 530.

Jacobson, Encyclopedia of Chemical Reactions, vol. 4, Reinhold, N.Y., 1951, p. 198.

Mellor, Comprehensive Treatise on Inorganic and Theoretical Chemistry, vol., Longmans, Green and Co., London, 1925, p. 323.

OSCAR R. VERTIZ, Primary Examiner.

J. J. BROWN, G. T. OZAKI, Assistant Examiners.